ELECTRONIC STORAGE DEVICE

Filed Dec. 31, 1951 2 SHEETS—SHEET 1

FIG I

INVENTOR
ERNEST S. HUGHES JR.
BY Charles P. Boberg
ATTORNEY

INVENTOR
ERNEST S. HUGHES JR.
BY Charles P. Boberg
ATTORNEY

Patented Feb. 10, 1953 2,628,309

UNITED STATES PATENT OFFICE 2,628,309

ELECTRONIC STORAGE DEVICE

Ernest S. Hughes, Jr., Vestal, N. Y., assignor to International Business Machines Corporation, New York, N. Y., a corporation of New York Application December 31, 1951, Serial No. 264,295

11 Claims. (Cl. 250—27)

This invention relates to electronic storage devices, and its principal objects are to increase the stability of such devices and to facilitate the switching thereof.

Electronic storage devices of the type contemplated by the present invention are adapted to assume stable "on" and "off" conditions and to switch from one condition to the other in response to applied voltage pulses. A storage device of this type must have sufficient sensitivity so that it can be switched readily under the control of the external pulses, and it should also be extremely stable during the intervals between pulses. Engineers tend to look upon these requirements as being somewhat contradictory, and in designing these storage devices, it is customary to effect compromises which will satisfy the particular conditions under which they will operate. The present invention represents a somewhat different approach to the problem of designing electronic storage devices in that it seeks to reconcile the desirable properties of high stability and ease of switching, so that the one will contribute to the other or at least not interfere with it.

In carrying out the foregoing objects, I provide a novel storage device comprising a pair of inverters having alternate states of maximum and minimum conductivity, the second of these inverters being controlled by the first, together with a cathode follower controlled by the second inverter for furnishing an output to a low-impedance load, a first diode for feeding back a portion of the cathode follower output to the first inverter and a second diode for feeding the external input signal to the first inverter. The feedback from the cathode follower, acting either by itself or in conjunction with the input signal (depending upon the form of circuit employed), exerts a stabilizing influence upon the inverters. The double diode entry arrangement facilitates switching the storage device under the control of the input signal.

The principle of the invention is particularly useful when applied to ring circuits, although it may be applied also to individual storage units. In the form of ring circuit which is proposed herein, each stage constitutes a storage device of the character just described, including a pair of inverters, a cathode follower which serves as an output tube and a pair of diodes arranged as a voltage coincidence switch. The voltages applied to the coincidence switch consist of a feedback voltage derived from the cathode follower of that stage, and a common input signal which is supplied concurrently to all of the stages. The stage which is "on" is held latched in that condition by the coincidence of the input signal and feedback voltage polarities. A reversal of the input signal polarity destroys this coincidence in the case of the stage which was "on," thereby turning said stage "off" and simultaneously turning the next stage "on," whereupon the aforesaid latching action is repeated in the case of the stage which is now "on." This provides a simple, easy and reliable way in which to operate a ring.

Other objects and features of the invention will be pointed out in the following description and claims and illustrated in the accompanying drawings, which disclose, by way of examples, the principle of the invention and the best modes, which have been contemplated, of applying that principle.

In the drawings:

Fig. 1 is a schematic showing of a ring circuit which embodies the principle of the invention.

Figs. 2, 2*a*, 2*b*, 2*c* and 2*d* are timing diagrams which illustrate certain waveforms.

Figure 1:
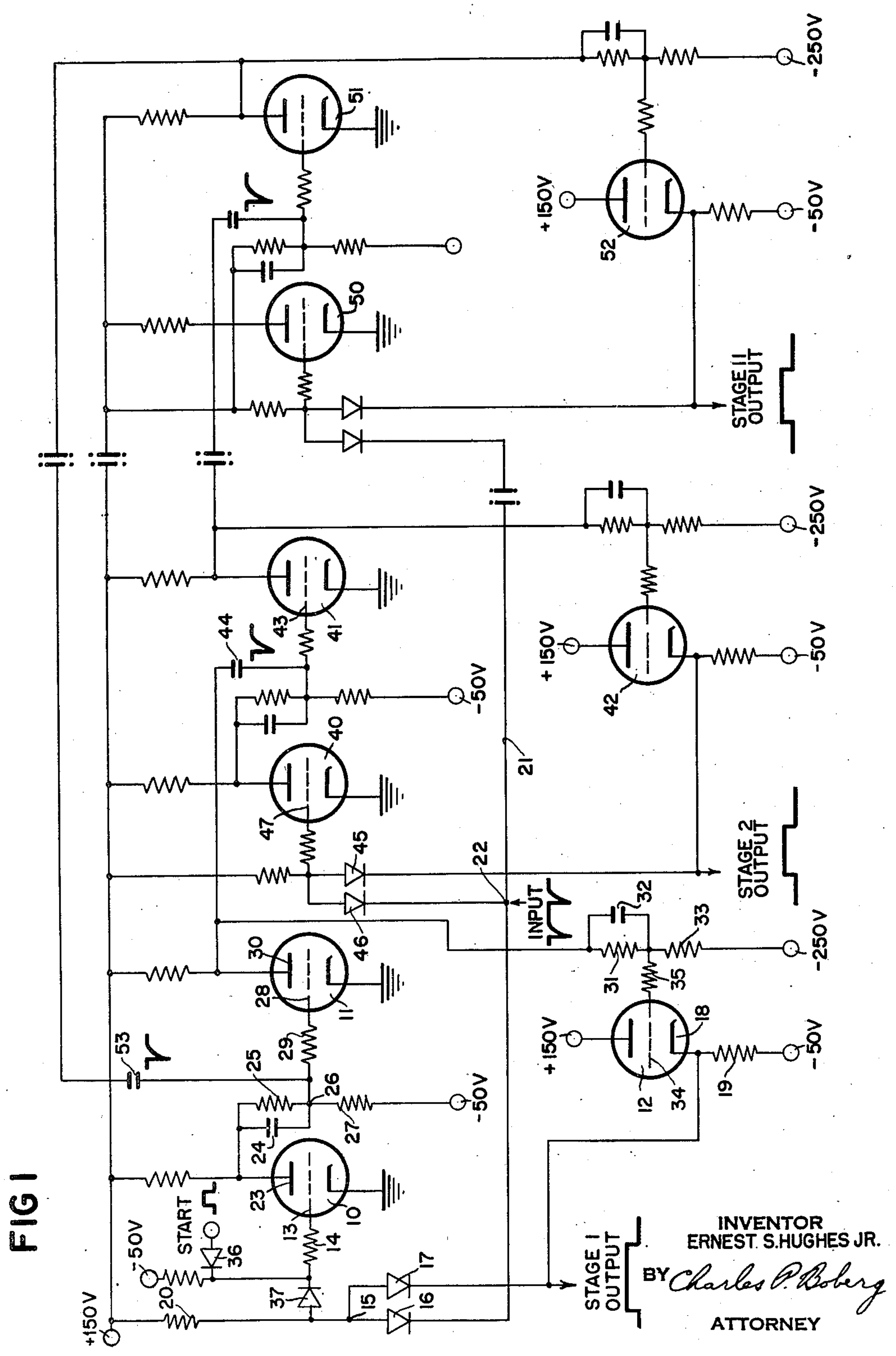

Fig. 1 illustrates schematically the first, second and final stages of an 11-point ring wherein each stage comprises a storage unit of the type contemplated by the present invention. The first stage, for example, includes the triode inverters 10 and 11 and a cathode follower 12. Although the inverters 10 and 11 are represented as separate tubes, they may, if desired, be placed in a single envelope. The grid 13 of the inverter 10 is connected through a resistor 14 and a diode 37 (the latter being an element of a diode mixer 36—37 used for starting purposes only) to the common terminal 15 of a positive coincidence switch comprising the diodes 16 and 17. These diodes are generally germanium crystals, but other forms of diodes may be used if desired. The common terminal 15 of the diodes 16 and 17 is connected through a resistor 20 to a source of plate voltage represented as a +150 volt supply. The opposite terminal of the diode 17 is connected directly to the cathode 18 of the cathode follower 12, which cathode is connected through a load resistor 19 to a source of negative bias represented as a —50 volt supply. The opposite terminal of the diode 16 is connected to a line 21 through which an input voltage wave is supplied to the ring system.

Figures 2, 2A, 2B, 2C, 2D:
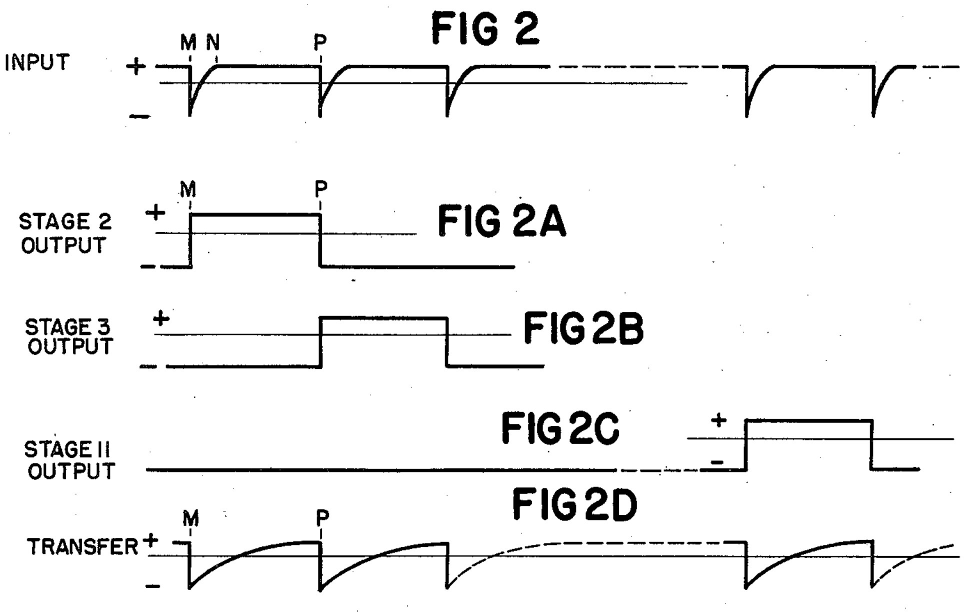

Fig. 2 illustrates the general type of voltage waveform which is employed for the input signal. This voltage wave is supplied by a suitable source (not shown) to the point 22 on the line 21, Fig. 1. Normally the input voltage, between points N and P on the wave, Fig. 2, is maintained at a steady positive value. At regular intervals a negative pulse is delivered, bringing the input voltage down to a limiting negative value, as indicated at the point M, Fig. 2. Between the points M and N the voltage rises abruptly to its normal positive value. This type of voltage wave can be furnished by well-known means such as a magnetic drum pickup feeding through an amplifier.

The plate 23 of the inverter 10 is connected through the parallel combination of a capacitor 24 and resistor 25 to a point 26, which point is connected through a resistor 27 to a negative bias supply (−50 volts). The grid 28 of the inverter 11 is connected through a resistor 29 to the point 26. The arrangement is such that when the inverter 10 is conducting, the voltage at the plate 23 thereof is sufficiently low so that the grid 28 of the inverter 11 is below cutoff. When the inverter 10 is not conducting, the voltage of the grid 28 is raised above cutoff and the inverter 11 conducts.

When the first stage is "off," the inverter 10 is cut off and the inverter 11 is conducting. The plate 30 of the inverter 11 is connected through a resistor 31 (by-passed by a capacitor 32) and a resistor 33 to a negative voltage source (−250 volts). The grid 34 of the cathode follower 12 is connected by a resistor 35 to the junction of the resistors 31 and 33. With the inverter 11 conducting, the voltage at the plate 30 thereof is sufficiently low so that the grid 34 of the follower 12 is below cutoff. Under these conditions the cathode 18 of the follower 12 is held at a negative potential. Due to the voltage drop in the resistor 20, the terminal 15 of the diode switch 16—17 is maintained at such a value that the inverter 10 is held below its cutoff point.

Any of the stages in the ring may be turned "on" by applying to the grid of the first inverter in that stage a positive pulse of a magnitude sufficient to start conduction. Thus, assuming that all of the stages are "off," and that it is desired to turn the first stage "on," a positive starting pulse may be applied from a suitable source (not shown) through the mixer diode 36 to the grid 13 of the inverter 10, thereby raising the voltage of the grid 13 above the cutoff value. When the tube 10 starts conducting, the voltage of the plate 23 drops, thereby lowering the potential of the grid 28 in the inverter 11 below cutoff. The inverter 11 stops conducting, which causes the potential of its plate 30 to rise. Thereupon, the potential of the cathode follower grid 34 rises above cutoff. As the cathode follower 12 conducts, the cathode voltage thereof becomes positive, thereby applying positive potential to one of the elements 17 of the diode switch. At this time the input line 21 is either at its normal positive potential or is returning to its normal positive potential following one of the periodic negative input pulses. The starting pulse is made sufficiently long to insure that the positive output of the cathode follower 12 continues while the input line 21 is being restored to its positive potential. The resulting coincidence of positive voltages at the terminals of the diodes 16 and 17 insures that the grid 13 of the tube 10 will remain above cutoff and that the tube 10 will continue to conduct after the starting pulse has ceased. The first stage thus is "latched" in its "on" condition, with the positive feed-back voltage from the cathode follower 12 and the positive input voltage on line 21 serving to hold the first stage in this condition. The cathode follower 12 in each stage furnishes a positive output pulse during the time in which the stage is "on," as will be explained more fully hereinafter.

The input voltage wave (Fig. 2) for operating the ring shown in Fig. 1 consists of a normal positive potential which is interrupted periodically by negative pulses. Each time one of these negative pulses occurs, the stage which has been "on" is switched "off" and the next stage automatically is switched "on." Assuming that the first stage is "on," the first negative pulse occurring at point M, Fig. 2, destroys the coincidence of positive voltages at the switch 16—17, with the input line 21 now being at a negative potential. The grid 13 of the inverter 10 is thereby driven below cutoff, the inverter 11 starts to conduct, and the cathode follower 12 is cut off. The output of the cathode follower 12 now being negative, the grid 13 will not be permitted to rise above cutoff when the positive potential is restored to the input line 21 at point N, Fig. 2. Hence, the first stage is held in its "off" condition.

The second stage of the ring comprises the inverters 40 and 41 and the cathode follower 42, all of which are arranged in a manner substantially identical with the first stage. The grid 43 of the inverter 41 is connected through a coupling capacitor 44 to the plate 30 of the inverter 11 in the first stage. When the inverter 11 starts to conduct, the voltage of the plate 30 drops, causing a negative transfer pulse to be applied through the capacitor 44 to the grid 43. The transfer signal is represented in Fig. 2*d*, which is a composite of all the transfer pulses from stage to stage arranged on a single time base. At point M the transfer pulse from stage 1 to stage 2 commences. As can be seen by comparing Fig. 2*d* with Fig. 2, the width of the negative portion of the transfer pulse is greater than the width of the negative input pulse M—N, Fig. 2. This insures that the inverter 41 will be maintained nonconductive until the input line 21 has been restored to its normal positive potential. Therefore, the cathode follower 42 will furnish a positive output to the diode 45 of the coincidence switch 45—46 while a positive potential is being reapplied to the other diode 46 of this switch.

The output pulse of stage 2 (Fig. 2*a*) commences at point M, when the cathode follower 42 starts to conduct (this occurring at the instant when the inverter 41 is cut off). The inverter 40 does not start to conduct until a coincidence of positive voltages occurs at switch 45—46, at which time the grid 47 is raised above cutoff, and the stage is latched in its "on" condition. Conduction then takes place in the tube 40 and continues until point P, Fig. 2, when the next negative input pulse occurs. At point P the positive coincidence is destroyed, driving grid 47 below cutoff. The inverter 40 stops conducting, the inverter 41 starts to conduct, and the cathode follower 42 stops conducting. The output of the follower 42 becomes negative, thereby ending the output pulse of stage 2 at point P, Fig. 2*a*, and from this point on stage 2, is maintained in its "off" condition.

As stage 2 is switched "off," the following stage automatically is switched "on" and remains "on" until the next negative input pulse turns it "off." During the interval while each stage is "on," the cathode follower thereof furnishes a positive output voltage. When the 11th or final stage (comprising the inverters 50 and 51 and the cathode follower 52, Fig. 1) is switched "off," a transfer pulse is available at the plate of the inverter 51. If the ring is to be closed, this transfer pulse is communicated through a capacitor 53 to the grid 28 of the inverter 11 in the first stage, thereby turning the first stage "on." If the ring is to be open, the feedback path from the last stage to the first stage is omitted, thereby causing each stage to remain in its "off" condition until a starting pulse is applied by external means to one of the stages. The entire ring can be cancelled at any time by holding the input voltage negative until the transfer pulse is dissipated.

Figure 3:
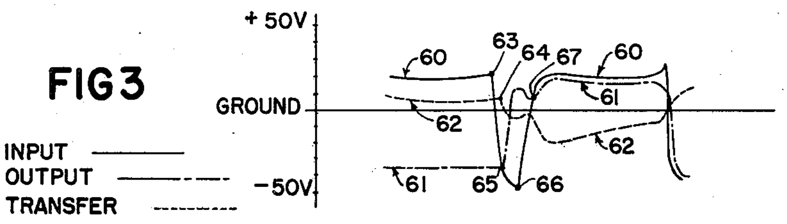
Fig. 3 is a composite oscillographic representation of three of the waveforms shown in the timing diagrams.

Fig. 3 is a composite timing diagram representing the input voltage wave, the output voltage wave and the transfer signal for a single stage, as they would be viewed on an oscilloscope. The curve 60 depicts one cycle of the input voltage wave. Curve 61 represents the output of a particular stage (stage 2, for example). Curve 62 is the transfer signal which passes from stage 1 to stage 2 as the former stage is switched "off" and the latter stage is switched "on." In other words, the curve 62 shows the variation of the voltage at the grid 43 of the inverter 41 in stage 2.

After the input voltage starts to swing negative, at the point 63, Fig. 3, and passes the cutoff value for the inverter 10, Fig. 1, the inverter 11 starts to conduct. This produces a drop in the voltage at the grid 43, commencing at point 64, Fig. 3. When this grid voltage drops below the cutoff value for the inverter 41, the output voltage of the cathode follower 42, Fig. 1, commences to rise at point 65, Fig. 3. The input voltage, curve 60, reaches its lower limit at point 66 and then commences to rise. Eventually, the rising output voltage, curve 61, and the rising input voltage, curve 60, reach a point 67 (Fig. 3) where they are sufficiently positive to hold or "latch" the inverter 40, Fig. 1, in its conductive state. It will be noted that this latching action occurs before the negative portion of the transfer pulse, curve 62, is dissipated.

Figure 4:
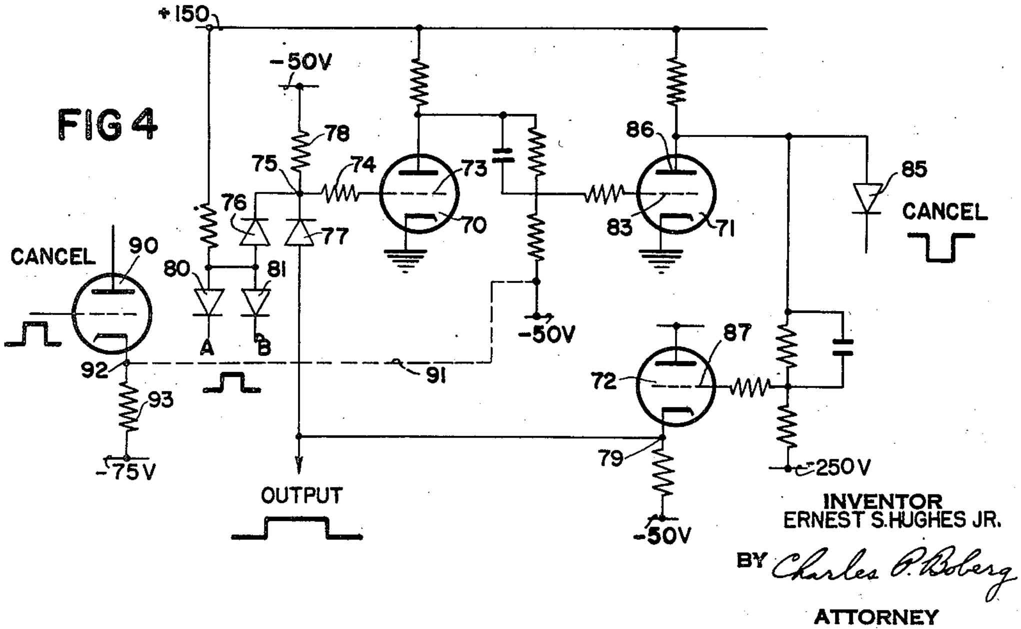
Fig. 4 is a schematic showing of a single storage unit in which the principle of the invention is embodied.

Fig. 4 illustrates schematically an individual storage unit utilizing the "latch" principle described hereinabove. The triode inverters 70 and 71 and the cathode follower 72 are arranged and interconnected in substantially the same manner as are the corresponding elements in a single stage of the ring circuit shown in Fig. 1. In the present case, however, the grid 73 of the inverter 70 is connected through a resistor 74 to the common terminal 75 of a diode mixer comprising the diodes 76 and 77. The junction 75 is connected through a resistor 78 to a negative bias supply (—50 volts). The opposite terminal of the diode 77 is connected to the output terminal 79 of the cathode follower 72. During the time when the storage unit is "on" and the output voltage thereof is positive, the potential of the grid 73 is held above cutoff, thereby latching the unit. At other times the grid 73 is held below its cutoff potential by the negative bias supply.

When the storage unit shown in Fig. 4 is to be employed in a diode matrix, or a similar network, to detect a coincidence of pulses, the input terminal of the mixer diode 76 is connected to the common terminal of a coincidence switch comprising diodes 80 and 81. Then a coincidence of positive voltage pulses on the two lines A and B, acting through the switch diodes 80 and 81 and the mixer diode 76, causes the inverter 70 to conduct and thereby switches the storage unit "on" for storing a pulse.

To cancel the setting of the storage unit shown in Fig. 4 and thereby terminate the positive output pulse, a negative cancel pulse may be applied through a diode 85 to the plate 86 of the inverter 71, which plate is coupled to the grid 87 of the cathode follower 72. This cuts off the follower 72 and changes the output thereof from a positive potential to a negative potential, thus removing the positive latching voltage from the grid 73 of the first inverter 70. There being no positive input voltage at this time, the grid 73 assumes its normal negative potential, and the inverter 70 is cut off.

An alternative method of cancelling the storage unit shown in Fig. 4 is to employ a cathode follower 90 as a cancel tube for supplying a positive cancel pulse to the grid 83 of the second inverter 71. When this arrangement is employed, the grid 83 is disconnected from the —50 volt bias supply and is connected instead through a line 91 to the output terminal 92 of the cathode follower 90, which terminal is connected in turn through the load resistor 93 of the follower 90 to a —75 volt bias source. A single cancel tube such as 90 can be employed to cancel as many as ten latch units in this manner. When the cancel tube 90 is not conducting, its cathode serves as a bias supply to the various storage units.

The present invention, as may be observed from the above-disclosed embodiments thereof, is applicable to storage units which are adapted to supply low-impedance, power-consuming loads. It should be distinguished, therefore, from the type of storage units which are employed in electronic counters and the like, where the loads are negligible. In each of the storage devices illustrated herein, the cathode follower feedback and diode entry features combine to afford high stability when needed and ease of switching from one stable condition to another. The advantages of switching in this manner are especially pronounced in the case of the ring (Fig. 1), wherein the progressive latching and unlatching of the stages will follow instantaneously the variations of a common input voltage without any adverse effect upon the stability of any stage. The feature of being able to cancel the ring at any time by holding the input voltage negative is also very useful.

While there have been shown and described and pointed out the fundamental novel features of the invention as applied to several preferred embodiments thereof, it will be understood that various omissions and substitutions and changes in the form and details of the illustrated devices and in their operations may be made by those skilled in the art, without departing from the spirit of the invention. It is the intention, therefore, to be limited only as indicated by the scope of the following claims.

What is claimed is:

1. An electronic storage device comprising first, second and third electron discharge devices each having an output electrode and a control electrode and each being adapted to assume alternate states of maximum and minimum conductivity in response to voltages impressed upon the control electrode thereof, means coupling the control electrode of said second electron discharge device to the output electrode of said first electron discharge device for causing said second electron discharge device to assume a state of conductivity opposite to that of said first electron discharge device, means coupling the control electrode of said third electron discharge device to the output electrode of said second electron discharge device for causing said third electron discharge device to assume a state of conductivity opposite to that of said second electron discharge device and corresponding to the state of conductivity of said first electron discharge device, a voltage coincidence switch having an output terminal connected to the control electrode of said first electron discharge device and having a pair of input terminals through which voltages may be separately impressed upon the last-mentioned control electrode, one of said switch input terminals being connected to the output electrode of said third electron discharge device, and an input line connected to the other of said switch input terminals for applying thereto an input voltage that varies intermittently between predetermined limits, whereby the state of conductivity of said first electron discharge device is controlled in response to the relationship between said input voltage and the output voltage of said third electron discharge device.

2. An electronic storage device comprising first and second electron discharge devices each having an output electrode and a control electrode and each being adapted to assume alternate states of maximum and minimum conductivity in response to variable voltages impressed upon the control electrode thereof, means coupling the control electrode of said second electron discharge device to the output electrode of said first electron discharge device for causing said second electron discharge device to assume a state of conductivity opposite to that of said first electron discharge device, a cathode follower having an output electrode and a control electrode, means coupling the control electrode of said cathode follower to the output electrode of said second electorn discharge device means including a diode for coupling the output electrode of said cathode follower to the control electrode of said first electron discharge device, an input conductor for supplying to said storage device an input voltage that varies intermittently between predetermined limits, and a second diode for connecting said input conductor to the control electrode of said first electron discharge device, whereby the state of conductivity of said first electron discharge device is determined by both the input voltage and the output voltage of said cathode follower.

3. An electronic storage device comprising a first inverter adapted to assume alternate states of maximum and minimum conductivity, a second inverter adapted to assume alternate states of maximum and minimum conductivity, said second inverter being coupled to and controlled by said first inverter so that said inverters are in opposite states of conductivity, feedback means including a cathode follower and a diode for applying a signal from the output side of said second inverter to the input side of said first inverter, and additional input means including a second diode for independently applying a separate input signal to said first inverter.

4. An electronic storage device comprising a first inverter having a control electrode and adapted to assume alternate states of maximum and minimum conductivity in response to predetermined voltages of differing polarities impressed upon said electrode, a second inverter controlled by said first inverter, a cathode follower controlled by said second inverter for furnishing output voltages of differing polarities in accordance with the conductive state of said second inverter, input means including a first diode for applying to said control electrode input voltages of varying values, and means including a second diode coupling said control electrode to said cathode follower for applying to said electrode a feedback voltage which varies between predetermined limits of differing polarities depending upon the conductive state of said cathode follower, whereby the conductive state of said first inverter is controlled by said input voltage and said feedback voltage.

5. An electronic storage device comprising a first inverter having a control electrode and adapted to assume alternate states of maximum and minimum conductivity in response to predetermined voltages of differing polarities impressed upon said electrode, a second inverter controlled by said first inverter, a cathode follower controlled by said second inverter for furnishing output voltages of differing polarities in accordance with the conductive state of said second inverter, an input conductor for supplying to the storage device input voltages of varying magnitudes and polarities, and a coincidence switch including a pair of diodes respectively connected to said input conductor and to said cathode follower for latching said first inverter in one of its alternate conductive states when both the input voltage and the cathode follower output voltage are of a given polarity.

6. An electronic storage device comprising a first inverter having a control electrode and adapted to assume alternate states of maximum and minimum conductivity in response to predetermined voltages of differing polarities impressed upon said electrode, a second inverter controlled by said first inverter, a cathode follower controlled by said second inverter for furnishing output voltages of differing polarities in accordance with the conductive state of said second inverter, an input conductor for supplying to the storage device input voltages of varying magnitudes and polarities, and a diode mixer including a pair of diodes respectively connected to said input conductor and to said cathode follower, whereby said first inverter is caused to change its conductive state in response to a change of input voltage polarity and is thereafter maintained in such conductive state by the output voltage from said cathode follower.

7. An electronic ring having a plurality of stages and means for supplying a common input signal thereto, said ring comprising, in each of said stages, a pair of inverters each adapted to assume alternate states of maximum and minimum conductivity, with the relationship between said inverters being such that the conductive state of the first inverter normally causes the second inverter to assume an opposite conductive state, input means for each stage including a pair of diodes arranged in a coincidence switch for causing the first inverter to assume a given state of conductivity only when the voltages respectively applied to said diodes are both of a given polarity, and an output means for each stage including a cathode follower controlled by the second inverter and coupled through one of said diodes to the first inverter for supplying a feedback voltage to said first inverter, said common input signal supply means being coupled through the other of said diodes to said first inverter, whereby each stage is maintained in a predetermined condition as regards the conductive states of its inverters so long as the common input signal and the feedback voltage for that stage are of a given polarity and is switched to the opposite condition when the polarity of the input signal is reversed, said ring also comprising an individual transfer means between each pair of adjacent stages so that the switching of one stage causes the next stage to be switched.

8. A ring as defined in claim 7, wherein said transfer means serves to couple the second inverter of one stage to the second inverter of the following stage in such fashion that a reversal of the one inverter produces an opposite reversal of the other inverter.

9. An electronic ring having a plurality of stages and means for supplying a common input signal thereto, said ring comprising, in each of said stages, a first tube means controlled by said common input signal means for assuming alternate states of maximum and minimum conductivity in response to variations of the input signal, a second tube means controlled by said first tube means for assuming a conductive state opposite to that of said first tube means, and feedback means including a cathode follower coupling said second tube means to said first tube means for maintaining said first tube means in the state of conductivity which said first tube means has assumed in response to said input signal.

10. An electronic storage device for use in combination with a voltage coincidence switch which is adapted to furnish a given output voltage in response to simultaneous input voltage pulses of like polarity applied to said switch, said device comprising a first inverter having an input side thereof connected to the output side of said coincidence switch, a second inverter controlled by said first inverter, said inverters being adapted to assume opposite states of maximum and minimum conductivity in response to the output of said coincidence switch, and a cathode follower controlled by said second inverter for furnishing an output voltage as determined by the conductive state of said second inverter and for applying a feedback voltage to the input side of said first inverter.

11. An electronic storage device as defined in claim 10, which includes a diode mixer so arranged in relation to said first inverter as to mix the output voltage from said coincidence switch and the feedback voltage from said cathode follower.

ERNEST S. HUGHES, JR.

No references cited.